United States Patent [19]
Maki et al.

[11] Patent Number: 5,136,444
[45] Date of Patent: Aug. 4, 1992

[54] FLOATING TYPE MAGNETIC HEAD HAVING A MAGNETIC GAP FOR RECORDING TRACKS AT THE OUTER PERIPHERY OF A MAGNETIC DISK

[75] Inventors: Hitoshi Maki; Chitatsu Sano, both of Yamanashi, Japan

[73] Assignee: TDK Corporation, Tokyo, Japan

[21] Appl. No.: 491,822

[22] Filed: Mar. 12, 1990

[30] Foreign Application Priority Data

Mar. 16, 1989 [JP] Japan .................................. 1-64492

[51] Int. Cl.⁵ .......................... G11B 5/60; G11B 21/20
[52] U.S. Cl. .................................................... 360/103
[58] Field of Search ......................................... 360/103

[56] References Cited

U.S. PATENT DOCUMENTS

| | | | |
|---|---|---|---|
| 4,435,736 | 3/1984 | Herman | 360/103 |
| 4,658,314 | 4/1987 | Sasazaki | 360/103 |
| 4,669,011 | 5/1987 | Lemke | 360/103 |
| 4,779,154 | 10/1988 | Kakuno et al. | 360/103 |
| 4,851,942 | 7/1989 | Kumasaka | 360/103 |
| 4,870,520 | 9/1989 | Shaw | 360/103 |
| 4,945,434 | 7/1990 | Wilmer | 360/103 |
| 4,972,279 | 11/1990 | Atesmen et al. | 360/103 |

FOREIGN PATENT DOCUMENTS 61-51615  3/1986  Japan .................................. 360/103

*Primary Examiner*—A. J. Heinz
*Attorney, Agent, or Firm*—Oblon, Spivak, McClelland, Maier & Neustadt

[57] ABSTRACT

According to this invention a floating type magnetic head has a floating section in the form of rails on a magnetic slider and a magnetic gap is formed on the slider at an outermost side thereof so as to be capable of being positioned at an outermost circumference of a magnetic disk. Since the tracks located at the outermost circumference of a disk are the longest, the present invention allows the recording wavelength to be shortened and the recording density to be increased.

8 Claims, 5 Drawing Sheets

FLOATING TYPE MAGNETIC HEAD HAVING A MAGNETIC GAP FOR RECORDING TRACKS AT THE OUTER PERIPHERY OF A MAGNETIC DISK

BACKGROUND OF THE INVENTION

This invention relates to a floating type magnetic head, and more particularly to a monolithic type magnetic head which is used for data recording/reproducing of mainly hard disks.

A floating type magnetic head of this type is generally provided with two or three rail like projections in the traveling direction of a disk on a core base member which faces a magnetic disk, and a magnetic gap is formed on the tip end of one of the projections. FIG. 4 is a perspective view to show a floating type magnetic head having three rail like projections viewed from the side contacting the disk wherein a base core 10 of a ferrite magnetic material is integrally formed with two separated grooves and three projected rails 11, 12, 13, and a front core 14 shaped like is attached to the front end of the central projection rail 12 to form a magnetic gap 15 therebetween.

FIG. 5 shows a magnetic head having two projected rails 11, 13 one of which 11 is attached to a front core 14 shaped like at the front end thereof. In either case, the front core 14 has a window 16 formed in the bored portion of the shape thereof and a winding 17 is wound around it. The projected rails are forced upon disk surface with a predetermined pressure by a spring (not shown) mounted between an attachment groove on the surface of the base core 10 and a head holder (not shown). The magnetic head as a whole becomes slightly floated from the disk due to the air resistance caused between the rails and disk when the magnetic disk is revolved. A magnetic gap 15 is then formed at the center of the width on the rail on the side facing the disk, and the length l thereof determines the width of a track which is being recorded on the magnetic disk.

As shown in FIG. 5, the portion where the rail front end is joined with the core 14 on the base core 10 is notched on both sides in a concave fashion and fused glass 18 is filled therein, forming a magnetic gap 15 at the center of the portion sandwiched by the glass-filled sides 18.

In most of the aforementioned prior art floating type magnetic heads, the front core and the magnetic gap thereof are formed on the center rail of the plural projected rails on a base core, and therefore when data is recorded by such a magnetic head on a magnetic disk and if the magnetic head is positioned at the outermost periphery of the disk, there is created a region between the outside rail 11 and the center rail 12 where recording tracks cannot be formed. At the inmost side of the disk, tracks cannot be formed also in the region extending from the position inside of the center rail 12 to the inner rail 13 to thereby reduce the recording capacity. Generally, the outermost track has a longer recording wavelength (recording interval along the track) and a larger output than inner tracks. Therefore, when a magnetic gap is formed at the central position of the base core as in the prior art, it is quite disadvantageous in terms of recording capacity. Even if a magnetic gap is formed on the outer rail as shown in the two-rail type device in FIG. 5, the position of the magnetic gap is closer to the inside on the rail surface facing the disk, or in other words at a position deviated from the outermost side of the rail inward by about 0.3 mm, the recording/reproducing region would be wasted by the width equal to deviation. The prior art magnetic head is also defective in that it needs a cumbersome process in manufacture as the rail has to be notched on both sides thereof and filled with fused glass subsequently.

SUMMARY OF THE INVENTION

This invention was contrived to eliminate aforementioned defects encountered in the prior art and attempts to improve recording capacity and characteristics by positioning the magnetic gap at the outermost periphery as much as possible on the base core.

According to this invention, there are provided a floating type magnetic head having plural projected magnetic sliders one of which is formed, at an end thereof, with a magnetic gap positioned at the time of reproducing the recorded data at the outermost position of the surface of a projected magnetic slider which faces the magnetic disk, the projected magnetic slider being positioned at the outer circumference of the magnetic disk.

Another feature of the invention is to provide a floating type magnetic head as set forth above wherein the end of said projected magnetic slider positioned at the outer circumference of the magnetic disk at the time of recording/reproducing is protruded from the slider main body toward downstream in the magnetic disk traveling direction, and the magnetic gap is formed on the outermost side of the protruded section on the surface facing the disk.

DESCRIPTION OF THE PREFERRED EMBODIMENTS

This invention will now be described referring to preferred embodiments shown in attached drawings.

Figure 1A:
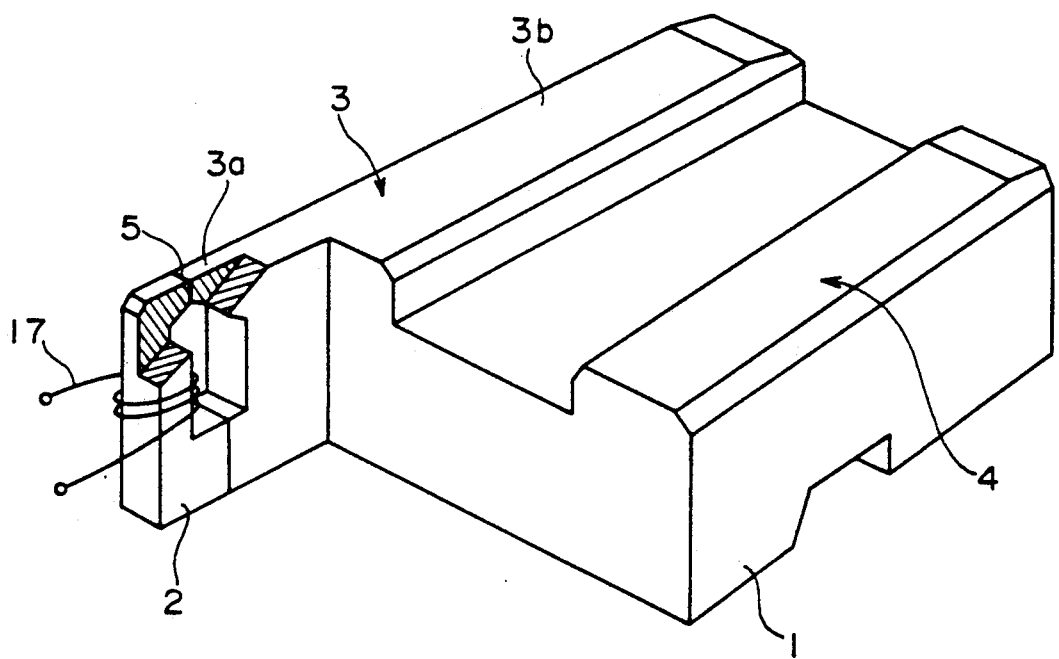
FIGS. 1A, 1B and 1C are perspective views to show embodiments of the floating type magnetic head according to this invention.
Figure 1B:
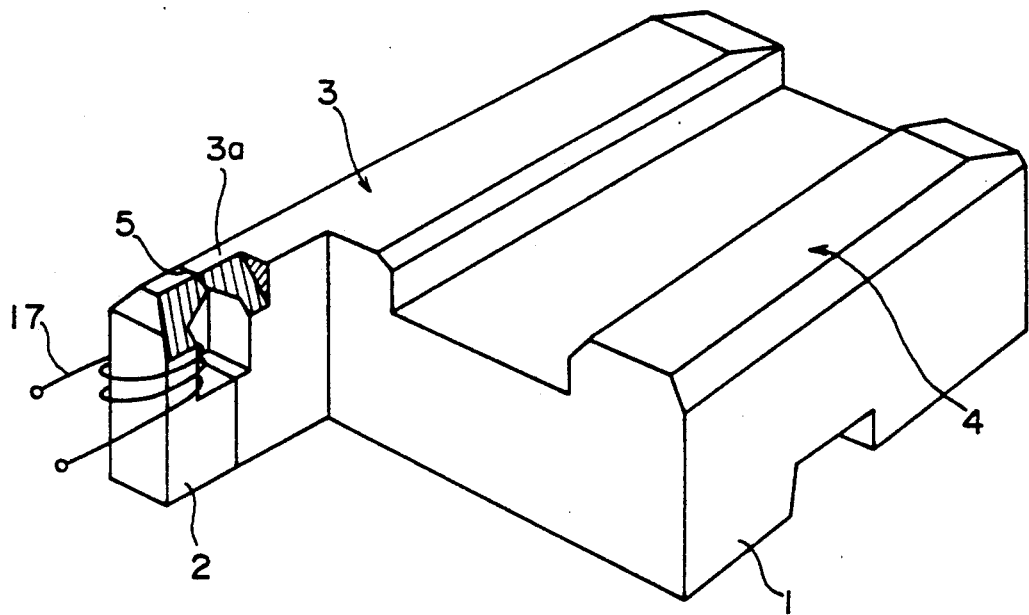
Figure 1C:
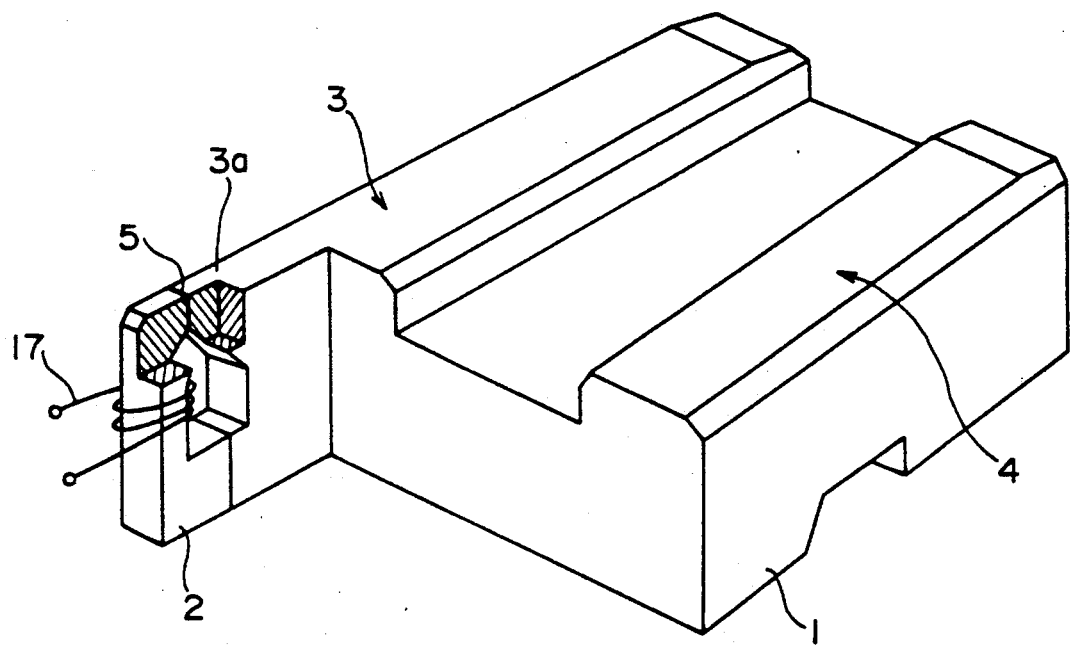

FIGS. 1A, 1B and 1C are perspective views to respectively show various embodiments of the floating type magnetic head according to this invention. In these embodiments, a base core 1 made of a single material such as ferrite magnetic is formed on the surface facing a magnetic disk with a pair of projected rails 3, 4, and one of the rails, or more particularly the outer projected rail 3 which is positioned on the side of outer circumference of a magnetic disk 8 (refer to FIG. 3) when the magnetic head is placed to face the disk is attached on the front end thereof (the end facing the revolutional direction of the disk) with a front core 2 of the shape of via a non-magnetic member, and a magnetic gap 5 is formed between the core 2 and the rail 3. Similarly to those shown in FIGS. 4 and 5, the inner and outer edges of the rails 3, 4 are chamfered along the length thereof.

Figure 2:
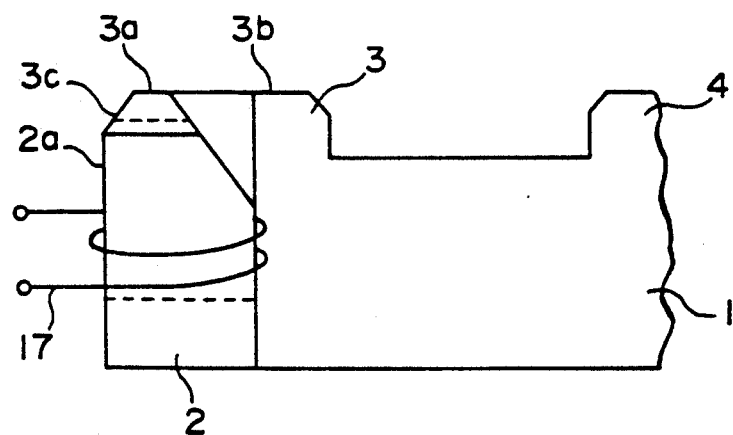
FIG. 2 is a partial frontal view to show the magnetic head shown in FIG. 1B but viewed from the disk traveling direction.

The surface extending from the front end of the outer rail 3 to the front core 2 which faces a magnetic disk is either cut out diagonally as shown in FIGS. 1A and 1B or rectangularly as shown in FIG. 1C. By cutting out the inner side of the surface as above, the width of the surface 3a of the rail 3 which slides against a magnetic disk becomes narrower at the position of the magnetic gap 5 than the other surface 3b of the same rail. FIG. 1A shows the surface which is cut out to form a slope inclining in the traveling direction of a magnetic medium while FIG. 1B shows the surface which is cut out to form a slope inclining perpendicularly to the traveling direction of the medium. The magnetic gap 5 is formed across the narrower surface 3a to be a recording/reproducing track. In other words, the magnetic gap 5 is formed at the outermost side of the surface of the rail 3 facing the disk. The magnetic gap 5 is formed, more particularly, at a position which is separated from the outside surface 2a of the base core 1 or the front core 2 by the distance equal to the chamfered portion 3c on the rail edge as shown in FIG. 2. In the prior art shown in FIG. 5, the surface extends in the longitudinal direction of the rail with the same width, and the magnetic gap defining the track width is formed at the center of the surface. As stated above, in the prior art head, the outer side of the surface is cut out inward (by ca. 0.3 mm). Therefore, in the case of a recording track of the width from 0.005 to 0.03 mm, ten to several tens of tracks will be left unused.

Figure 3:
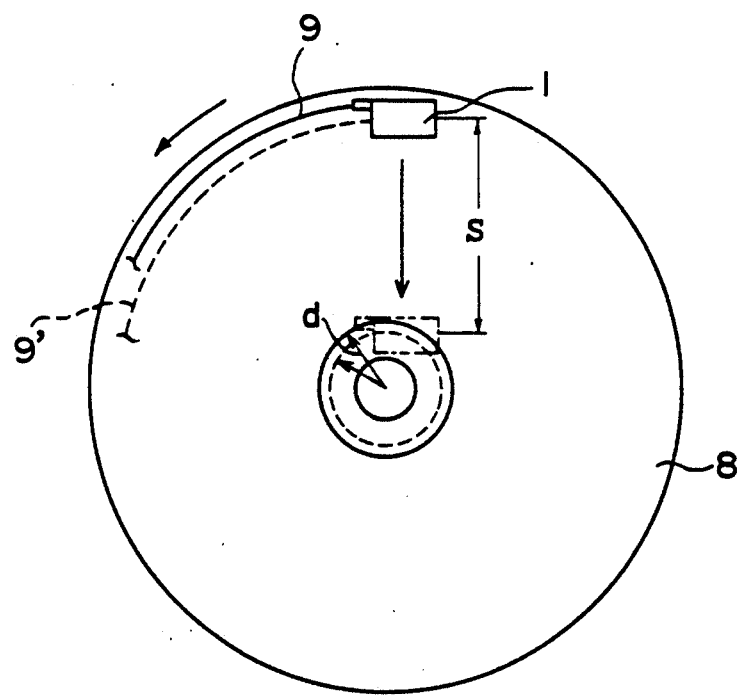
FIG. 3 is a plane view to show the state of recording and/or reproducing data on a magnetic disk with this invention magnetic head.
Figure 4:
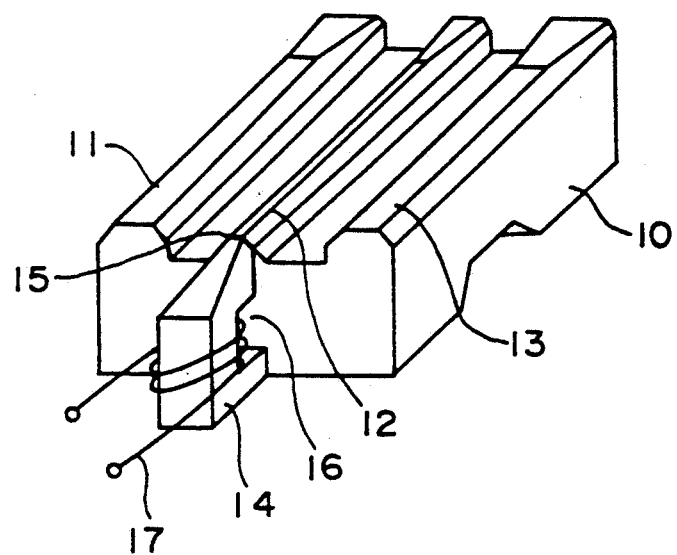
FIG. 4 is a perspective view to show a prior art floating type magnetic head having three rails.

In the magnetic disk device using this invention magnetic head shown in FIGS. 1A, 1B and 1C, when the magnetic disk 8 is recorded/reproduced of the data by the magnetic head, if the head is positioned at the outermost circumference of the disk 8 shown in FIG. 3, the track 9 may be formed on farther outer side of the disk than in the case of the prior art. If the head stroke S is the same, the diameter d of the center track at the stroke end close to the center of the disk may be set greater than in the prior art, the recording wavelength may be shortened proportionally (or with a higher frequency), and recording density may be increased to thereby increase recording capacity as a whole. The track 9' indicated with broken lines in FIG. 3 indicates the outermost track formed in the prior art head having three rails wherein a magnetic gap is formed at the center rail.

Figure 5:
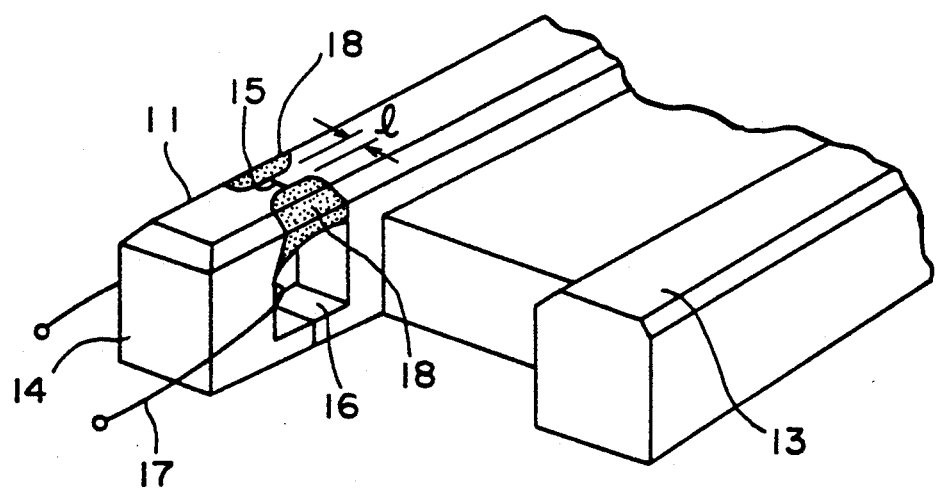
FIG. 5 is a partially enlarged perspective view to show a prior art floating type magnetic head having two rails.

In the prior art head with twin rails which is formed with a magnetic gap on the outer rail shown in FIG. 5, the diameter of the track at the outermost circumference is smaller than the one according to this invention. This invention is not only applicable to the head with two projected rails but also to the one having three rails.

As described in the foregoing statement, this invention provides a magnetic head which can increase output to improve characteristics, and can record/reproduce a magnetic disk fully to the outermost circumference to thereby increase the recording capacity simply by providing a magnetic gap section at a position at the outermost side as much as possible on a base core. This invention magnetic head can achieve a higher precision in the track width by largely cutting out the inner side of a rail at the position of the gap and by forming the magnetic gap at the outermost side thereof.

What is claimed is:

1. A floating type magnetic head for recording/reproducing data onto a magnetic disk rotating in a disk traveling direction, said magnetic head comprising:
    a base core having an outside surface;
    an outer projected rail having an outside surface formed continuously with said outside surface of said base core, said outer projected rail projecting from said base core toward said magnetic disk;
    an inner projected rail located radially inside said outer projected rail relative to said magnetic disk, said inner projected rail projecting from said base core toward said magnetic disk;
    a front core attached to a downstream end of said outer projected rail;
    an upper flat surface formed on said outer projected rail; and
    a magnetic gap formed between said front core and said outer projected rail, said magnetic gap extending to an outermost extremity of said upper flat surface of said outer projected rail;
    wherein said outer projected rail has a portion extending downstream of said base core in said disk traveling direction, and wherein said base core, said outer projected rail, and said portion extending downstream of said base core are constituted by a single block of machined magnetic material; and
    wherein said portion extending downstream of said base core is narrower in a direction parallel to said upper flat surface and perpendicular to said disk traveling direction than a portion of said outer projected rail over said base core.

2. A floating type magnetic head as claimed in claim 1, wherein said portion extending downstream of said base core is further narrowed by a cut out at said downstream end of said outer projected rail 3. A floating type magnetic head as claimed in claim 2, wherein said front core is narrowed by a cut out in the vicinity of said magnetic gap.

4. A floating type magnetic head for recording/reproducing data onto a magnetic disk rotating in a disk traveling direction, said magnetic head comprising:
    a base core having an outside surface;
    an outer rail having an outside surface formed contiguously with said outside surface of said base core, said outer projected rail projecting from said base core toward said magnetic disk;
    an inner projected rail located radially inside said outer projected rail relative to said magnetic disk, said inner projected rail projecting from said base core toward said magnetic disk;
    a front core attached to a downstream end of said outer projected rail;
    an upper flat surface formed on said outer projected rail; and
    a magnetic gap formed between said front core and said outer projected rail, said magnetic gap extending to an outermost extremity of said upper flat surface of said outer projected rail;
    wherein said outer projected rail has a portion extending downstream of said base core in said disk traveling direction;
    wherein said base core, said outer projected rail, and said portion extending downstream of said base core are constituted by a single block of machined magnetic material;
    wherein said magnetic gap extends completely across said upper flat surface; and
    wherein said upper flat surface has a width measured in a direction perpendicular to said disk traveling direction, said width being reduced in the vicinity of said magnetic gap by a cut out formed in a radially interior side of said outer projected rail relative to said magnetic disk.

5. A floating type magnetic head as claimed in claim 4, wherein said cut out has a bottom surface inclined in said traveling direction and extending from said upper flat surface to said downstream end.

6. A floating type magnetic head as claimed in claim 4, wherein said cut out has a bottom surface inclined perpendicular to said traveling direction and extending from said upper flat surface to said radially interior side of said outer projected rail.

7. A floating type magnetic head as claimed in claim 4, wherein said cut out is a rectangularly shaped cut out.

8. A floating type magnetic head as claimed in claim 4, wherein said inner and outer projected rails have inner and outer edges, respectively, and wherein said inner and outer edges are chamfered along an entire length thereof.

* * * * *